(12) United States Patent
Mowrer et al.

(10) Patent No.: US 8,722,835 B2
(45) Date of Patent: May 13, 2014

(54) ONE COMPONENT POLYSILOXANE COATING COMPOSITIONS AND RELATED COATED SUBSTRATES

(75) Inventors: Norman R. Mowrer, Cumming, GA (US); James E. McCarthy, Roswell, GA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 324 days.

(21) Appl. No.: 13/011,284

(22) Filed: Jan. 21, 2011

(65) Prior Publication Data
US 2011/0118406 A1 May 19, 2011

Related U.S. Application Data

(63) Continuation-in-part of application No. 12/211,276, filed on Sep. 16, 2008.

(60) Provisional application No. 60/972,835, filed on Sep. 17, 2007.

(51) Int. Cl.
*C08G 77/24* (2006.01)

(52) U.S. Cl.
USPC .............. 528/28; 528/38; 528/18; 525/100; 525/446; 525/474

(58) Field of Classification Search
USPC ............. 528/18, 28, 38; 525/100, 446, 474
See application file for complete search history.

(56) References Cited

U.S. PATENT DOCUMENTS

| | | |
|---|---|---|
| 4,146,585 A | 3/1979 | Ward et al. |
| 4,554,310 A | 11/1985 | Wengrovius et al. |
| 5,275,645 A | 1/1994 | Tenoir et al. |
| 6,107,370 A | 8/2000 | Bowlin |
| 6,987,144 B2 | 1/2006 | Anderson et al. |
| 2002/0115770 A1* | 8/2002 | Georgeau et al. ............. 524/377 |
| 2004/0116639 A1 | 6/2004 | Lim et al. |
| 2005/0288415 A1* | 12/2005 | Beers et al. .................... 524/425 |
| 2007/0213492 A1 | 9/2007 | Mowrer et al. |
| 2008/0075870 A1 | 3/2008 | Ambrose et al. |
| 2008/0125539 A1* | 5/2008 | Mack ............................. 524/588 |
| 2008/0311419 A1 | 12/2008 | Ramdatt et al. |
| 2009/0076217 A1 | 3/2009 | Gommans et al. |

FOREIGN PATENT DOCUMENTS

RU  2246517  2/2005

* cited by examiner

*Primary Examiner* — Margaret Moore
(74) *Attorney, Agent, or Firm* — Noland Cheung

(57) ABSTRACT

Disclosed are one-component low temperature, moisture curable, storage stable coating compositions that include a silanol-functional silicone and/or an alkoxy-functional silicone, a flexibilizer comprising a reaction product of two or more reactants, and a curing agent selected from amines, aminosilanes, ketimines, aldimines, and combinations thereof. Particular compositions include of said silicones, a flexibilizer comprising a polymer having an alkoxysilane terminal unit as well as a urethane linkage, and a combination of an aminosilane, a trifunctional oxysilane and an aminoalcohol. Also disclosed are substrates at least partially coated with a coating deposited from such a composition and methods for coating substrates with such compositions.

12 Claims, No Drawings

ONE COMPONENT POLYSILOXANE COATING COMPOSITIONS AND RELATED COATED SUBSTRATES

CROSS-REFERENCE TO RELATED APPLICATIONS

This application is a continuation-in-part of U.S. patent application Ser. No. 12/211,276, filed Sep. 16, 2008, and which claims the benefit of U.S. Provisional Patent Application Ser. No. 60/972,835, filed Sep. 17, 2007, each which being incorporated herein by reference.

FIELD OF THE INVENTION

The present invention relates to, among other things, one-component low temperature, moisture curable, storage stable polysiloxane coating compositions, and related coated substrates.

BACKGROUND INFORMATION

Polysiloxane coatings are a class of coatings that offer unique features including good weatherability; abrasion resistance; corrosion resistance; graffiti resistance; capability to achieve low volatile organic content (VOC); and environmental, health, and safety respiratory sensitization advantages. Typically, polysiloxane coatings are provided as two-component systems. This is largely because it is difficult to formulate one-component polysiloxane coatings which cure quickly when exposed to ambient humidity and temperature, yet retain good flexibility and still have good package stability. One-component coatings are popular in the marketplace and offer certain benefits over two-component systems, such as, time savings/efficiency, waste reduction, reduction in paint related mixing errors, and labor savings. Of those one-component polysiloxane coatings that do currently exist, many have slower dry times and less than desirable flexibility, negatively impacting speed and efficiency as well as coating properties.

As a result, it would be desirable to provide one-component polysiloxane coating compositions that retain the traditional one-component benefits described above and quickly cure at ambient conditions; provide capability to achieve low VOC; provide good flexibility; while maintaining good storage stability. Moreover, it would be desirable to provide such one-component coating compositions that are resistant to yellowing.

The present invention has been developed in view of the foregoing.

SUMMARY OF THE INVENTION

In certain respects, the present invention relates to a one-component low temperature, moisture curable, storage stable coating composition comprising: (a) an alkoxy and/or silanol-functional silicone; (b) a polymer comprising an alkoxysilane terminal unit and a urethane linkage; (c) an aminosilane present in an amount of 0.01 to less than 1 percent by weight, based on the total weight of the composition; (d) an amino alcohol; and (e) a trifunctional oxysilane.

These and other respects will become more apparent from the following description.

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As previously mentioned, certain embodiments of the present invention are directed to one-component low temperature, moisture curable coating compositions. As used herein, the term "one-component" and like terms refers to coating compositions provided in the form of a single component system, wherein all of the coating components are combined and stored in a single container. As used herein, the term "low temperature, moisture curable" and like terms refers to coating compositions that, following application to a substrate, are capable of achieving cure in the presence of ambient air, the air having a relative humidity of 10 to 100 percent, such as 25 to 80 percent, and a temperature in the range of −10 to 120° C., such as 5 to 80° C., in some cases 10 to 60° C. and, in yet other cases, 15 to 40° C. As used herein, the term "storage stable" and like terms refers to coating compositions that do not gel or solidify, but rather remain liquid and at viscosities suitable for application of the coating compositions over a long period of time, for example, for a period of more than three (3) months at ambient conditions.

As used herein, the term "cure" and like terms refers to a coating wherein any crosslinkable components of the composition are at least partially crosslinked. In certain embodiments, the crosslink density of the crosslinkable components, i.e., the degree of crosslinking, ranges from 5% to 100%, such as 35% to 85%, or, in some cases, 50% to 85% of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen.

As will also be appreciated by those skilled in the art, the degree of cure can be determined by testing the solvent resistance of a coating to double rubs of methyl ethyl ketone. The higher the number of double rubs with no damage to the coating, the greater degree of cure. In this test, the index finger holding a double thickness of cheesecloth saturated with methyl ethyl ketone is held at a 45° angle to the coating surface. The rub is made with moderate pressure at a rate of 1 double rub per second. As used herein, when it is stated that a coating is "completely cured" it means that the coating is resistant to 100, in some cases 200, double rubs of methyl ethyl ketone according to the foregoing procedure, with no damage to the coating.

As used herein, the term "polymer" is meant to encompass oligomer, and includes without limitation both homopolymers and copolymers.

As previously mentioned, in certain embodiments, the coating compositions of the present invention comprise an alkoxy and/or silanol-functional silicone. As used herein, the term "silanol-functional silicone" and like terms refers to silicones comprising silanol functional groups, —SiOH. As used herein, the term "silicone" and like terms refers to polysiloxane polymers, which are based on a structure comprising alternate silicon and oxygen atoms. As used herein, "silicone" and "siloxane" are used interchangeably.

In certain embodiments, the silanol-functional silicone comprises a compound represented by the general formula:

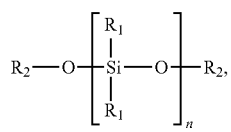

wherein each $R_1$ is independently selected from the group consisting of a hydroxy group, an alkyl group having up to six carbon atoms, and an aryl group having up to six carbon atoms; each $R_2$ is independently selected from the group consisting of a hydrogen, an alkyl group having up to six carbon atoms, and an aryl group having up to six carbon atoms, wherein at least one of $R_1$ and $R_2$ is selected such that the compound comprises a silanol group. In certain embodiments, $R_1$ and $R_2$ comprise groups having less than six carbon atoms to facilitate rapid hydrolysis, which reaction is driven by the volatility of the alcohol analog product of the hydrolysis. In certain embodiments, "n" is selected so that the foregoing silanol-functional silicone has a weight average molecular weight in the range of from 200 to 300,000.

In certain embodiments, the silanol-functional silicone comprises phenyl groups, methyl groups, and combinations thereof. In other embodiments, the ratio of phenyl groups to methyl groups present in the silanol-functional silicone ranges from 1:1 to 1.3:1. In yet other embodiments, the silanol-functional silicone comprises diphenyl groups. In certain embodiments, each $R_2$ is a hydrogen. In other embodiments, $R_1$ comprises a methyl group and/or a phenyl group and each $R_2$ is a hydrogen.

In still other embodiments, the silanol-functional silicone has a silanol content of 6 weight percent or less, such as 3 weight percent or less, such as 1 weight percent or less, wherein weight percent is based on the total weight of the silanol-functional silicone.

Silanol-functional silicones which are suitable for use in the present invention are commercially available and include, but are not limited to, for example, diphenyldihydroxy silanes, as well as, Dow Corning's DC-805, DC-409HS, and DC-840.

In certain embodiments, a combination of different silanol-functional silicones may be used in the coating compositions of the present invention.

In certain embodiments, the previously described silanol-functional silicone may be present in the coating compositions of the present invention in an amount ranging from 20 to 65 percent by weight, such as from 30 to 60 percent by weight, or in some cases, 50 to 55 percent by weight, with the weight percents being based on the total weight of the coating composition. In other embodiments, the previously described silanol-functional silicone is present in the coating compositions of the present invention in an amount of at least 1 percent by weight, such as at least 5 percent by weight, or in some cases, at least 10 percent by weight, based on the total weight of the composition. In addition, in some of these embodiments, the previously described silanol-functional silicone is present in the coating compositions of the present invention in an amount of no more than 30 percent by weight, such as no more than 25 percent by weight, or in some cases, no more than 20 percent by weight, based on the total weight of the composition.

As previously mentioned, in certain embodiments, the coating compositions of the present invention comprise an alkoxy-functional silicone. As used herein, the term "alkoxy-functional silicone" and like terms refers to silicones comprising only alkoxy functional groups, —OR, wherein R may be an alkyl group or an aryl group.

In certain embodiments, the alkoxy-functional silicone comprises a compound represented by the general formula:

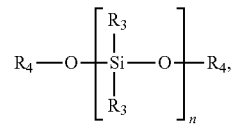

wherein each $R_3$ is independently selected from the group consisting of an alkyl group having up to six carbon atoms, an aryl group having up to six carbon atoms, and an alkoxy group having up to six carbon atoms; each $R_4$ is independently selected from the group consisting of an alkyl group having up to six carbon atoms and an aryl group having up to six carbon atoms. In certain embodiments, $R_3$ and $R_4$ comprise groups having less than six carbon atoms to facilitate rapid hydrolysis, which reaction is driven by the volatility of the alcohol analog product of the hydrolysis. In certain embodiments, "n" is selected so that the alkoxy-functional silicone has a weight average molecular weight in the range of from 400 to 10,000, such as from 800 to 2,500.

In certain embodiments, the alkoxy-functional silicone is methoxy-functional. In other embodiments, the alkoxy-functional silicone has a methoxy content of 20 weight percent or less, such as 18 weight percent or less, wherein weight percent is based on the total weight of the alkoxy-functional silicone.

In other embodiments, the alkoxy-functional silicone comprises phenyl groups, methyl groups, and combinations thereof. In still other embodiments, the ratio of phenyl groups to methyl groups ranges from 0.5:1 to 1:1.

Alkoxy-functional silicones which are suitable for use in the present invention are commercially available and include, but are not limited to, for example, methoxy-functional silicones, including DC-3074 and DC-3037, commercially available from Dow Corning; and GE SR 191, SY-550, and SY-231, commercially available from Wacker Silicones located in Adrian, Mich.

In certain embodiments, a combination of different alkoxy-functional silicones may be used in the coating compositions of the present invention.

In certain embodiments, the previously described alkoxy-functional silicone may be present in the coating compositions of the present invention in an amount ranging from 5 to 25 percent by weight, such as from 5 to 15 percent by weight, or, in some cases, 8 to 12 percent by weight, with the weight percents being based on the total weight of the coating composition. In other embodiments, the previously described alkoxy-functional silicone is present in the coating compositions of the present invention in an amount of at least 10 percent by weight, such as at least 15 percent by weight, or in some cases, at least 20 percent by weight, based on the total weight of the composition. In addition, in some of these embodiments, the previously described alkoxy-functional silicone is present in the coating compositions of the present invention in an amount of no more than 50 percent by weight, such as no more than 40 percent by weight, or in some cases, no more than 30 percent by weight, based on the total weight of the composition.

As will be appreciated by those skilled in the art, weight average molecular weight of any one or more components present in the coating compositions of the present invention, including the silanol-functional silicones and alkoxy-functional silicones, may impact the volatile organic content (VOC) of the coating composition. Typically, components having a high weight average molecular weight result in coating compositions having a higher VOC, whereas components having a low weight average molecular weight typically result in coating compositions having a lower VOC. As will be appreciated by those skilled in the art, VOC of the coating compositions of the present invention may be varied by choosing components of varying weight average molecular weights in the coating compositions of the present invention. For example, alkoxy-functional silicones and/or silanol-functional silicones having different weight average molecular weights, or blends thereof, may be used and amounts may be varied in order to provide coating compositions with different VOCs.

As one skilled in the art would recognize, weight average molecular weight may also impact other properties including the flexibility of a coating deposited from the coating compositions of the present invention.

In certain embodiments, the silanol-functional silicones present in the coating composition of the present invention may have a weight average molecular weight of from 200,000 to 300,000, while in other embodiments, the silanol-functional silicones present in the coating composition of the present invention may have a weight average molecular weight of from 200 to 7,000.

In certain embodiments, a blend of silanol-functional silicones and alkoxy-functional silicones at different weight average molecular weights may be used in the coating compositions of the present invention.

As previously indicated, the coating compositions of the present invention comprise a flexibilizer. As used herein, the term "flexibilizer" and like terms refers to a component in the coating compositions of the present invention that improves the flexibility of a coating deposited from the coating compositions by providing, for example, increased elongation, improved impact resistance, and/or improved crack resistance to the coating.

It is surprising that the flexibilizers of the present invention provide flexibility to the coating without harming the coating's appearance, dry times, weatherability, and chemical resistance, as it would have been predicted that such flexibilizers would soften the coating leading to poor chemical resistance, slow dry times, and poor weatherability, although the inventors do not wish to be bound by this. Indeed, in certain embodiments, the flexibilizers of the present invention have been shown to improve, in addition to flexibility, at least one other property, including dry time, hardness, chemical resistance, weatherability, and storage stability.

In certain embodiments, the flexibilizer present in the coating compositions of the present invention comprises a reaction product of two or more reactants. As used herein, the term "reaction product" refers to a compound formed from the combination and reaction, to some extent, of two or more reactants. In other words, two or more reactants may be combined together and after such combination, permitted to react to some extent with each other, such as by chemical reaction, to provide a reaction product that may be used as a flexibilizer in the coating compositions of the present invention. In certain embodiments, at least one of the two or more reactants combined to form a flexibilizer has reactive groups reactive with the reactive groups of another of the two or more reactants.

In certain embodiments, the flexibilizers of the present invention comprise a polymer comprising an alkoxysilane terminal unit, that is, the polymer chain is capped with an alkoxysilane to provide a terminal unit. The particular polymeric compound will depend on the reactants used to form the flexibilizers.

In certain embodiments, the flexibilizer, in addition to the reactants, may further comprise a catalyst, such as an organometallic catalyst, including any of those organometallic catalysts described below. In certain embodiments, the catalyst may promote the reaction between the reactants to provide a reaction product. Any suitable organometallic catalyst may be used depending on the reactants present in the flexibilizer. Any suitable amount of organometallic catalyst may be used depending on the type and amount of reactants present in the flexibilizer. In certain embodiments, the catalyst is present from 0.01 to 1.0 percent by weight, with the weight percents being based on the total weight of the flexibilizer. In other embodiments, no catalyst is present in the flexibilizer.

In addition, other ingredients useful in forming the flexibilizers of this invention may include water, solvents, plasticizers, extenders, fillers, hydrocarbon resin modifiers, and various types of additives such as UV stabilizers, pigment wetting agents, flow and leveling additives, thixatropes, defoamers and the like. A combination of any of the ingredients may also be present. The ingredient(s) may be used in their ordinary amounts according to their ordinary purpose.

In certain embodiments, the flexibilizer may be prepared by combining the reactants, along with any of the other aforementioned ingredients (if present), and subjecting the combination to an elevated temperature, for example from 40° C. to 70° C., for a period of time to provide a reaction product. In other embodiments, the flexibilizer may be prepared by allowing the combination to set for a period of time at ambient conditions to provide a reaction product. In still other embodiments, after the reactants are combined, the combination may be subjected to both elevated temperatures for a period of time and ambient conditions for a period of time to provide a reaction product. Temperature(s) and time(s) may vary depending on the reactants present in the flexibilizer.

In certain embodiments, the flexibilizer is present in the coating composition of the present invention in an amount ranging from 0.5 to 30 percent by weight, such as 3 to 25 percent by weight, or, in some cases, 5 to 15 percent by weight, with the weight percents being based on the total weight of the coating composition.

In certain embodiments, the flexibilizer present in the coating compositions of the present invention comprises a reaction product of an epoxy-functional silane and an amine-functional resin.

As used herein, the term "epoxy-functional silane" refers to silanes comprising epoxy functional groups,

As used herein, the term "silane" refers to a compound containing a silicon atom in the backbone.

In certain embodiments, the epoxy-functional silane comprises glycidoxypropyltrialkoxy silane.

Epoxy-functional silanes which are suitable for use in the flexibilizers of the present invention are commercially available and include, but are not limited to, glycidoxypropyltrialkoxy silanes, including Z-6040, commercially available from Dow Corning, and those sold under the product name Silquest, including A-187, commercially available from OSi Specialties, Inc., Danbury, Conn.

As previously mentioned, in certain embodiments, the epoxy-functional silane may be combined with an amine-functional resin to provide a reaction product that may be used as a flexibilizer in the coating compositions of the present invention.

In certain embodiments, the amine-functional resin for use in the flexibilizers of the present invention is selected from polyamines, aliphatic amine adducts, polyamidoamines, cycloaliphatic amines and polyamines, aspartic ester amines, polyoxypropylenediamines, aromatic amines, and combinations thereof.

Suitable amine-functional resins for use in the present invention may include primary amines, secondary amines, or combinations thereof. Suitable primary amines are commercially available and include those available from Huntsman Chemical under the product name Jeffamine, such as, for example, polyoxypropylenediamines, including Jeffamine D400 to Jeffamine D2000. Suitable secondary amines include those available under the product name Ancamine, including Ancamine 2457 and XTJ-590 from Huntsman Chemical, and aspartic ester amines such as those commercially available from Bayer Corp. under the product name Desmophen, including Desmophen NH 1220, Desmophen NH 1420, and Desmophen NH 1521. In certain embodiments, combinations of primary and secondary amines may be used.

In certain embodiments, where the amine-functional resin comprises a secondary amine, the secondary amine may be adducted with the epoxy-functional silane. In certain embodiments, the reaction product resulting from this combination can be in the form of a molecule that is difunctional in primary amine (as a diketimine), and that is also functionalized as a trimethoxysilane. For example, this combination may create a "star" polymer comprising a central nitrogen atom having two carbon linkages extending therefrom that each include a ketimine end structure, and also include a third carbon linkage extending therefrom that includes a trialkoxyfunctionality extending therefrom, e.g., from a silicon atom. Such "star" polymer may have a triagonal center, for example, 120 degrees around a nitrogen atom, and may provide the combined properties of high functionality and low viscosity, as well as low VOC.

In certain embodiments, the equivalent ratio of the epoxy of the previously described epoxy-functional silane to the primary and/or secondary amine of the amine-functional resin ranges from 0.8:1 to 1.2:1 by weight, in some cases, 1:1 by weight.

In certain embodiments, the flexibilizer present in the coating compositions of the present invention comprises an ungelled, secondary amine-containing, Michael addition reaction product of a compound comprising more than one site of ethylenic unsaturation and an aminosilane.

In certain embodiments, the flexibilizers present in the coating compositions of the present invention comprise an ungelled, secondary amine-containing, Michael addition reaction product of reactants comprising a compound comprising more than one site of ethylenic unsaturation, i.e., a polyethylenically unsaturated compound, such as a poly (meth)acrylate. As used herein, the term "(meth)acrylate" is intended to include both methacrylates and acrylates. As used herein, the term "secondary amine-containing" refers to compounds comprising a secondary amine, which is a functional group wherein two organic substituents are bound to a nitrogen together with one hydrogen. As used herein, the term "ungelled" refers to resins that are substantially free of crosslinking and have an intrinsic viscosity when dissolved in a suitable solvent, as determined, for example, in accordance with ASTM-D1795 or ASTM-D4243. The intrinsic viscosity of the resin is an indication of its molecular weight. A gelled resin, on the other hand, since it is of essentially infinitely high molecular weight, will have an intrinsic viscosity too high to measure. As used herein, a resin (or polymer) that is "substantially free of crosslinking" refers to a reaction product that has a weight average molecular weight (Mw), as determined by gel permeation chromatography, of less than 1,000,000.

In certain embodiments, the compound comprising more than one site of ethylenic unsaturation comprises a polyethylenically unsaturated monomer, such as di- and higher acrylates. Specific examples of suitable polyethylenically unsaturated monomers are diacrylates, such as 1,6-hexanediol diacrylate, 1,4-butanediol diacrylate, ethylene glycol diacrylate, diethylene glycol diacrylate, tetraethylene glycol diacrylate, tripropylene glycol diacrylate, neopentyl glycol diacrylate, 1,4-butanediol dimethacrylate, poly(butanediol) diacrylate, tetraethylene glycol dimethacrylate, 1,3-butylene glycol diacrylate, triethylene glycol diacrylate, triisopropylene glycol diacrylate, polyethylene glycol diacrylate, and/or bisphenol A dimethacrylate; triacrylates, such as trimethylolpropane triacrylate, trimethylolpropane trimethacrylate, pentaerythritol monohydroxy triacrylate, and/or trimethylolpropane triethoxy triacrylate; tetraacrylates, such as pentaerythritol tetraacrylate, and/or di-trimethylolpropane tetraacrylate; and/or pentaacrylates, such as dipentaerythritol (monohydroxy) pentaacrylate.

In addition to or in lieu of the aforementioned polyethylenically unsaturated monomers, the flexibilizers of the present invention may comprise the Michael addition reaction product of reactants comprising a polyethylenically unsaturated oligomer. As will be appreciated, the term "oligomer" and "polymer" are frequently used interchangeably. Although the term "oligomer" is generally used to describe a relatively short polymer, the term has no generally accepted definition with respect to the number of repeating monomer units. As used herein, therefore, in describing compounds comprising more than one site of ethylenic unsaturation, the terms "oligomer" and "polymer" are meant to be interchangeable.

Examples of some specific polyethylenically unsaturated oligomers suitable for use in the present invention include, for example, urethane acrylates, polyester acrylates and mixtures thereof, particularly those that are free of hydroxyl functional groups. Specific examples of such materials include urethane acrylates, such as those sold by Cytec Surface Specialties Inc. under the product names Ebecryl 220 and Ebecryl 264 and polyester acrylates, such as Ebecryl 80 available from UCB Chemicals.

Further details are described in United States Patent Application Publication No. 2008/0075870 at paragraphs [0018] through [0021], the contents of which are incorporated herein by reference.

Combinations of any of the aforementioned compounds comprising more than one site of ethylenic unsaturation may also be suitable. In certain embodiments, the compound comprising more than one site of ethylenic unsaturation present in the flexibilizers of the present invention comprises 1,6-hexanediol diacrylate.

As previously indicated, the compound(s) comprising more than one site of ethylenic unsaturation identified above may be combined with an aminosilane to provide a reaction product that may be used as a flexibilizer used in the coating compositions of the present invention. As used herein, the term "aminosilane" refers to a compound having a molecular structure that includes an amine group and a silicon atom.

In certain embodiments, the aminosilane utilized in the flexibilizers of the present invention comprises a compound having the formula:

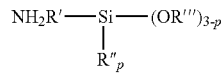

wherein R' is an alkylene group having from 2 to 10 carbon atoms, R" is an alkyl group, an aryl group, an alkoxy group, or an aryloxy group, each group having from 1 to 8 carbon atoms, R'" is an alkyl group having from 1 to 8 carbon atoms, and p has a value of from 0 to 2. In certain embodiments of the present invention, R' is an alkylene group having from 2 to 5 carbon atoms and p is 0, the use of which the inventors have discovered is, in at least some embodiments, best for obtaining dust free films in 10 minutes or less and completely cured films within 24 hours, under the low temperature, moisture cure conditions described earlier.

Specific examples of aminosilanes which are suitable for use in the flexibilizers of the present invention include aminoethyltriethoxysilane, γ-aminopropyltriethoxysilane, γ-aminopropylmethyldiethoxysilane, γ-aminopropylethyldiethoxysilane, γ-aminopropylphenyldiethoxysilane, γ-aminopropyltrimethoxysilane, δ-aminobutyltriethoxysilane, δ-aminobutylethyldiethoxysilane. Combinations of any of the aforementioned compounds may also be suitable. In certain embodiments, the aminosilane comprises a γ-aminopropyltrialkoxysilane.

In certain embodiments, the ungelled Michael addition reaction product is formed by simply blending the reactants at room temperature or at a slightly elevated temperature, for example, up to 100° C. The reaction of an amine group with an ethylenically unsaturated group which occurs in the flexibilizer of this invention is often referred to as a Michael addition reaction. As a result, as used herein, the term "Michael addition reaction product" is meant to refer to the product of such a reaction. Such products can be more heat and light stable than greater acrylyl content-containing products. It should be recognized that slowly adding the aminosilane to the compound comprising more than one site of ethylenic unsaturation results in there being a large excess of acrylate groups to aminosilane. Unless the temperature of the reaction mixture is kept sufficiently low, a gelled product can be the result. It is sometimes better, therefore, to add the unsaturated material to a reaction vessel already containing an aminosilane to obtain an ungelled reaction product. The reaction can be carried out in the absence of a solvent or in the presence of an inert solvent. Examples of suitable inert solvents are toluene, butyl acetate, methyl isobutyl ketone, and ethylene glycol monoethyl ether acetate. It is often desirable that the reaction be conducted in the absence of moisture or in a controlled amount of moisture to avoid unwanted side reactions and possibly gelation.

In certain embodiments, the Michael addition reaction is conducted such that the equivalent ratio of the ethylenically unsaturated groups to the amine groups is at least 1:1, in some cases, at least 1.05:1.

Further details are described in United States Patent Application Publication No. 2008/0075870 at paragraphs [0022] through [0024] and paragraphs [0026] through [0027], the contents of which are incorporated herein by reference.

In certain embodiments, the flexibilizer of the coating compositions of the present invention comprises a polymer comprising an alkoxysilane terminal unit and a urethane linkage, such as is the case with polymers comprising a reaction product of reactants comprising a hydroxyl-functional resin and an isocyanate-functional silane.

As used herein, the term "hydroxyl-functional resins" refers to resins comprising hydroxyl functional groups, —OH. As used herein, the term "isocyanate-functional silane" refers to silanes comprising isocyanate functional groups, —N=C=O.

Suitable examples of hydroxyl-functional resins may be selected from acrylic resins, polyurethane resins, polyester resins, alkyd resins, polyether resins, phenolic resins, phenolic silane resins, polycaprolactone resins, polysiloxane resins, and combinations thereof. In other embodiments, suitable drying oil fatty acids may be used as the hydroxyl-functional resin and include, for example, those derived from linseed oil, soy bean oil, tall oil, castor oil or tung oil, among others.

In certain embodiments, the hydroxyl-functional resin comprises a polyester resin comprising hydroxyl groups attached to a polyester backbone. Suitable hydroxyl-functional polyester resins are commercially available, for example, from Bayer Corp. under the trade name Desmophen, including Desmophen 651A, Desmophen 670A, Desmophen 800, Desmophen 1100, and Desmophen 670.

In other embodiments, the hydroxyl-functional resin comprises an acrylic resin comprising hydroxyl groups attached to an acrylic backbone. Suitable hydroxyl-functional acrylic resins are commercially available, for example, from BASF under the product name Joncryl, including Joncryl 948; from Bayer Corp. under the product name Desmophen, including Desmophen A160, Desmophen A760, and Desmophen A 450; and from Rohm & Haas including UCD-191HS.

In still other embodiments, the hydroxyl-functional resin comprises a polysiloxane resin comprising hydroxyl groups attached to a polysiloxane backbone. As used herein, "polysiloxane" refers to a polymer comprising a siloxane backbone. Suitable hydroxyl-functional polysiloxanes are described in U.S. Pat. No. 6,987,144, column 3, line 20 through column 12, line 64, the contents of which are incorporated herein by reference.

The hydroxyl functional group-containing polysiloxane can be prepared by reacting a polysiloxane containing hydroxyl functional groups with an anhydride to form the half-ester acid group under reaction conditions that favor only the reaction of the anhydride and the hydroxyl functional groups, and avoid further esterification from occurring.

Nonlimiting examples of suitable anhydrides include hexahydrophthalic anhydride, methyl hexahydrophthalic anhydride, phthalic anhydride, trimellitic anhydride, succinic anhydride, chlorendic anhydride, alkenyl succinic anhydride, and substituted alkenyl anhydrides such as octenyl succinic anhydride, and mixtures of any of the foregoing.

The half-ester group-containing reaction product thus prepared can be further reacted with a monoepoxide to form a polysiloxane containing at least one secondary hydroxyl group.

Nonlimiting examples of suitable monoepoxides are phenyl glycidyl ether, n-butyl glycidyl ether, cresyl glycidyl ether, isopropyl glycidyl ether, glycidyl versatate, for example, CARDURA E available from Shell Chemical Co., and mixtures of any of the foregoing.

In other embodiments, the hydroxyl-functional resin comprises a polyether resin comprising hydroxyl groups attached to a polyether backbone. Suitable hydroxyl-functional polyether resins are commercially available, for example, from Bayer under the product name Arcol, including Arcol 1150, and under the product name Desmophen, including Desmophen 1920, Desmophen 1915 and Desmophen 550.

Combinations of any of the aforementioned hydroxyl-functional resins may also be used in the flexibilizers of the present invention.

As previously mentioned, in certain embodiments, the flexibilizer comprises an isocyanate-functional silane as a reactant with the hydroxyl-functional resin.

Suitable examples of isocyanate-functional silanes are commercially available and include, for example, isocyanatoalkyloxysilanes such as, for example, isocyanatopropyltriethoxysilanes, under the product name A-Link from Momentive Performance Materials including A-Link 25 and A-Link 35; others are available from Shin-Etsu including, for example, under the product name KBE-9007.

In certain embodiments, combinations of isocyanate-functional silanes may be used. In certain embodiments, the isocyanate-functional silane comprises a γ-isocyanatopropyltriethyoxysilane.

In certain embodiments, the equivalent ratio of the isocyanate of the isocyanate-functional silane to the hydroxyl of the hydroxyl-functional resin ranges from 0.5:1 to 1.5:1 by weight, in some cases from 0.8:1 to 1.2:1 by weight. In other embodiments, the isocyanate of the isocyanate-functional silane may be reacted with the hydroxyl of the hydroxyl-functional resin such that there are no free isocyanate groups present in the flexibilizer.

In other embodiments, a combination of any of the flexibilizers prepared by reacting a hydroxyl-functional resin and an isocyanate-functional silane may also be used in the coating compositions of the present invention. For example, in certain embodiments, a flexibilizer prepared by reacting a hydroxyl-functional acrylic resin and an isocyanate-functional silane may be combined with a flexibilizer prepared by reacting a hydroxyl-functional polyester and an isocyanate-functional silane in the coating compositions of the present invention. Other combinations are also contemplated.

In certain embodiments, the flexibilizer of the present invention comprises a reaction product of a polyisocyanate and an aminosilane.

Nonlimiting examples of suitable polyisocyanates include aliphatic polyisocyanates, such as aliphatic diisocyanates, for example, 1,4-tetramethylene diisocyanate and 1,6-hexamethylene diisocyanate; cycloaliphatic polyisocyanates, for example, 1,4-cyclohexyl diisocyanate, isophorone diisocyanate, and α,α-xylylene diisocyanate; and aromatic polyisocyanates, for example, 4,4'-diphenyl-methane diisocyanate, 1,3-phenylene diisocyanate, and tolylene diisocyanate. These and other suitable polyisocyanates are described in more detail in U.S. Pat. No. 4,046,729, at column 5, line 26 to column 6, line 28, incorporated herein by reference. Combinations of any of the aforementioned polyisocyanates may also be used in the flexibilizers of the present invention. In certain embodiments, the polyisocyanate comprises an aliphatic diisocyanate, such as 1,6-hexamethylene diisocyanate.

Suitable examples of polyisocyanates are commercially available and include, for example, aliphatic diisocyanates available under from Bayer Corporation under the product name Desmodur, including N3200, N3300, N3390, and N3400. Suitable cycloaliphatic isocyanates are available from Bayer Corporation, including isophorone diisocyanate, sold under the product name Desmodur 4470.

As previously mentioned, in certain embodiments, a polyisocyanate may be combined with an aminosilane to provide the reaction product that may be used as a flexibilizer in the coating compositions of the present invention. Suitable aminosilanes have been described above and include, but are not limited to, for example, aminoethyltriethoxysilane, γ-aminopropyltriethoxysilane, γ-aminopropylmethyldiethoxysilane, γ-aminopropylethyldiethoxysilane, γ-aminopropylphenyldiethoxysilane, γ-aminopropyltrimethoxysilane, δ-aminobutyltriethoxysilane, δ-aminobutylethyldiethoxysilane, and aminoethylaminopropyltrimethoxysilane, and combinations thereof. In other embodiments, the aminosilane comprises a γ-aminopropyltrimethoxysilane.

Suitable aminosilanes are commercially available under the product name Silquest, including A-Link 15 available from Momentive Performance Materials.

In certain embodiments, the equivalent ratio of the isocyanate of the polyisocyanate to the amine of the aminosilane ranges from 0.8:1 to 1.2:1 by weight, in some cases from 1.0:1 to 1.1:1 by weight. In other embodiments, the isocyanate of the polyisocyanate may be reacted with the amine of the aminosilane such that there are no free isocyanate groups present in the flexibilizer.

In certain embodiments, the polyisocyanate may be reacted with a glycidyl alcohol followed by reaction with an aminosilane to provide a flexibilizer useful in the coating compositions of the present invention. In certain embodiments, reaction with the glycidyl alcohol may increase the organic chain length of the flexibilizer. As used herein, the term "glycidyl alcohol" refers to a material having both hydroxyl-functionality, —OH, and epoxy functionality,

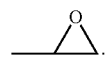

The amount of glycidyl alcohol present in the flexibilizer may vary depending on the desired chain length of the flexibilizer. In certain embodiments, the glycidyl alcohol is present in the flexibilizer in amounts ranging from 1 to 5 percent by weight, wherein weight percent is based on the total weight of the flexibilizer.

In certain embodiments, a combination of any of the aforementioned flexibilizers described above may be used in the coating compositions of the present invention.

In addition to the previously described components, the coating compositions of the present invention also comprise a curing agent selected from amines, aminosilanes, ketimines, aldimines, and combinations thereof. In certain embodiments of the coating compositions of the present invention, the curing agent behaves as an amine-functional condensation catalyst and catalyzes the silanol crosslinking reaction which occurs between the previously described silanol-functional silicone and the previously described alkoxy-functional silicone. In certain embodiments, the alkoxy-functional silicone has already undergone hydrolysis in the presence of ambient humidity.

Suitable amine curing agents for use in the present invention include amines, polyamines, aliphatic amine adducts, polyamidoamines, cycloaliphatic amines and polyamines, cycloaliphatic amine adducts, and aromatic amines. Suitable polyamines include those described in U.S. Pat. No. 3,668,183, which is incorporated herein by reference. In certain embodiments, the amine curing agents include primary amines, cycloaliphatic diamines, isophorone diamines, and other secondary amines such as those available, for example, from Air Products of Allentown, Pa., under the product name Ancamine, including Ancamine 2457; from Huntsman of Houston, Tex., under the product name XTJ-590; and primary amines such as those available from Huntsman under the product name Jeffamine including Jeffamine D400 to Jeffamine D2000.

Suitable aminosilane curing agents for use in the coating compositions of the present invention include compounds having the general formula: Y—Si—(O—X)$_n$, wherein n is 2 or 3; each X is independently selected from an alkyl group, a hydroxyalkyl group, an alkoxyalkyl group, and a hydroxyalkoxyalkyl group, each group containing less than six carbon atoms; and Y is H(HNR)$_c$, wherein "c" is an integer having a value of from 1 to 6; and each R is a difunctional organic radical independently selected from the group consisting of an aryl group, an alkyl group, a dialkylaryl group, an alkoxyalkyl group, and a cycloalkyl group, wherein R can vary within each Y molecule. Such materials are further described in United States Patent Application Publication No. 2006/0058451 A1 at [0052] to [0054], the cited portion of which being incorporated herein by reference.

Suitable aminosilanes include, but are not limited to, aminoethylaminopropyltriethoxysilane, n-phenylaminopropyltrimethoxysilane, trimethoxysilylpropyldiethylenetriamine, 3-(3-aminophenoxy)propyltrimethoxysilane, aminoethylaminomethylphenyltrimethoxysilane, 2-aminoethyl-3-aminopropyltriethoxysilane, tris-2-ethylhexoxysilane, n-aminohexylaminopropyltrimethoxysilane, trisaminopropyltrismethoxyethoxysilane, γ-aminopropyltrimethoxysilane, γ-aminopropyltriethoxysilane, γ-aminopropymethyldimethoxysilane, N-beta-(aminoethyl)-γ-aminopropyltrimethoxysilane, N-beta-(aminoethyl)-γ-aminopropyltriethoxysilane, and N-beta-(aminoethyl)-γ-aminopropymethyldimethoxysilane.

In certain embodiments, a combination of aminosilanes, including any of those previously indicated, may be used in the coating compositions of the present invention. In other embodiments, the aminosilane comprises a γ-aminopropyl-trialkoxysilane.

The manufacturers and product names of some aminosilanes useful in the present invention include, for example, Z6020, Z6011, XI-6100, and X16150 manufactured by Dow Corning; Silquest A1100, A1101, A1102, A1108, A1110, A1120, A1126, A1130, A1387, Y9632, A1637, A-2120 and A2639, and CoatOSil 2810 manufactured by GE; ED117 manufactured by Wacker; Dynasylan AMMO, AMEO-P, AMEO-T, DAMO, TRIAMO, 1122, 1126, 1146, 1189, 1204, 1411 and 1505, all manufactured by Degussa; and KBE-602, KBE-603 and KBE-903 manufactured by Shin-Etsu. In certain embodiments, the aminosilanes may comprise difunctional silanes including aminoethylaminopropyltrimethoxysilane, aminopropyltrimethoxysilane, and aminopropyltriethoxysilane. In other embodiments, the aminosilanes include those commercially available from GE under the product names A1110 and A1120.

Suitable ketimines or aldimines useful in the coating compositions of the present invention include those obtained by the reaction of an amine with either a ketone or an aldehyde, respectively, and include diketimines and dialdimines such as those described in U.S. Pat. No. 3,668,183. In certain embodiments, ketimines may include those available, for example, from Air Products under the product name 2457 (dimethylisobutyl ketone ketimine of diethylenetriamine); from Bayer of Leverkusen, Germany under the product name LS2965 (dimethylisobutyl ketone ketimine of isophorone diamine); and from Asahi Denka under the product names EH-235-RS-A and KBE-9103 (ketiminopropyltriethoxysilanes) from Shine-Etsu. In other embodiments, suitable aldimines may include a dialdimine of isophorone diamine, one that is available, for example, from Huls of Germany under the product name A139.

As will be appreciated, the type of curing agent(s) selected for inclusion in the coating compositions of the present invention will often depend on the particular type of application and type of other ingredients being used. As will also be appreciated, the coating compositions of the present invention can be formed using a combination of more than one type of curing agent. For example, and without limitation, a primary and/or secondary amine can be used in conjunction with an aminosilane. Additionally, polyether amino-functional amines can be used to flexibilize the curative package and/or also reduce the raw material cost of the curative materials. Secondary amines can be used to adduct epoxy functionality and to form a highly reactive polymer, e.g., a star polymer.

In certain embodiments, the curing agent is present in the coating composition in an amount ranging from 1 to 30 percent by weight, such as 2 to 25 percent by weight, or, in some cases, 5 to 18 percent by weight, with the weight percents being based on the total weight of the coating composition. It should be understood that one or more of the above-described curing agents can be used depending on the particular desired method for making the composition, and the desired properties for the resulting cured film coating.

It is surprising that the combination of components in the coating compositions of the present invention, i.e., a silanol-functional silicone; an alkoxy-functional silicone; a flexibilizer comprising a reaction product of two or more reactants; and a curing agent selected from amines, aminosilanes, ketimines, aldimines, and combinations thereof, such as those described above, provide a one-component low temperature, moisture curable coating composition having good storage stability, yet once a coating is applied to a substrate, the coating film has fast dry times, good appearance, and other good properties, including weatherability, chemical resistance, and flexibility (i.e., elongation, impact resistance, crack resistance, etc.). While not wishing to be bound by a particular theory, the inventors believe the combination of components maintain equilibrium while stored in a container prior to application, yet upon application, cure quickly when exposed to ambient humidity and temperature.

Moreover, certain embodiments of the compositions of the present invention comprise (i) an aminosilane, such as those described earlier, (ii) an amino alcohol, and (iii) a trifunctional oxysilane, wherein the aminosilane is present in an amount of 0.01 to less than 1 percent by weight, such as 0.01 to 0.9 percent by weight, 0.01 to 0.8 percent by weight, or, in some cases, 0.4 to 0.8 percent by weight based on the total weight of the coating composition. In fact, it was surprisingly discovered that one-component coating compositions of the present invention comprising such a combination with the previously described polymer comprising an alkoxysilane terminal unit and a urethane linkage and alkoxy and/or silanol-functional silicone exhibited good cure response (low dry times) while providing a coating that has reduced (or no) yellowing.

Amino alcohols suitable for use in the coating compositions of the present invention include, without limitation, dimethylethanolamine, dimethylpropanolamine, dimethylbutanolamine, methylethylmethanolamine, methylpropylmethanol amine, methylethylethanolamine, monoisopropylamine, methyldiethanolamine, triethanolamine, diethanolamine and ethanolamine.

In certain embodiments, the coating compositions of the present invention com comprise in the range of from 0.1 to 4 percent by weight, such as 1 to 3 percent by weight amino alcohol, or 2 percent by weight amino alcohol, based on the total weight of the coating composition. In certain embodiments, the weight ratio of the aminosilane to amino alcohol in the coating compositions of the present invention is no more than 1:1, in some cases it is less than 1:1, such as no more than 0.75:1 or no more than 0.5:1.

Trifunctional oxysilanes suitable for use in the present invention include those having the formula

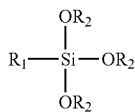

wherein $R_1$ is an alkyl, aryl, or cycloalkyl group an each $R_2$ is independently an alkyl, aryl, hydroxyalkyl, alkoxyalkyl, or a hydroxyalkoxyalkyl group. Specific examples of such compounds, which are suitable for use in the present invention, include methyltrimethoxysilane, methyltriethoxysilane, methyltrimethoxyethoxysilane, methyltripropoxysilane, methyltributoxysilane, ethyltrimethoxysilane, and ethyltriethoxysilane, and octyltriethoxysilane.

In certain embodiments, the coating compositions of the present invention corn comprise in the range of from 0.1 to 4 percent by weight, such as 1 to 3 percent by weight amino alcohol, or 2 percent by trifunctional oxysilane, based on the total weight of the coating composition. In certain embodiments, the weight ratio of the aminosilane to trifunctional oxysilane in the coating compositions of the present invention is from 1:5 to 5:1, in some cases it is from 1:2 to 2:1, such as 1:1.

In addition to the previously described components, the coating compositions of the present invention may comprise any of a variety of additional optional components. As the components are optional, therefore, in certain embodiments, the coating compositions of the present invention are substantially free, or, in some cases, completely free, of such an ingredient. As used herein, when it is stated that a coating composition of the present invention is "substantially free" of a particular material, it means that the material being discussed is present in the composition, if at all, as an incidental impurity. In other words, the material does not affect the properties of the composition. Moreover, when it is stated that a coating composition of the present invention is "completely free" of a particular material it means that the material being discussed is not present in the composition at all.

In certain embodiments, the coating compositions of the present invention comprise a catalyst, such as an organometallic catalyst. Suitable organometallic catalysts can be useful for the purpose of accelerating the curing rate of the composition into a protective film coating over a broad temperature range. In certain applications calling for ambient temperature cure of the composition, the organometallic catalyst may also be useful for providing accelerated cure rates at such ambient temperature cure conditions. Suitable catalysts include tin catalysts comprising a compound having the general formula:

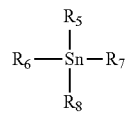

where $R_5$ and $R_6$ are each independently selected from an alkyl group, an aryl group, and an alkoxy group, each group having up to eleven carbon atoms, and where $R_7$ and $R_8$ are each independently selected from the same groups as $R_5$ and $R_6$, or from groups consisting of inorganic atoms, such as halogens, sulfur or oxygen. Example catalysts include organotin materials such as dibutyl tin dilaurate, dibutyl tin diacetate, dibutyltin diacetyldiacetonate, and organotitanates.

Other useful organometallic catalysts include lead octoate, lead neodecanoate, bismuth nitrate, bismuth octoate, bismuth neodecanoate, bismuth napthenate, bismuth versalate, manganese napthenate/pentanedione, manganese octoate, vanadium acetylacetonate, zinc acetylacetonate, tin neodecanoate, stannous 2-ethyl hexanoate, lithium neodecanoate, stannic chloride, stannous octoate, zinc napthenate, zinc octoate, ferric acetylacetonate, zinc acetylacetonate, cobalt octoate, zirconium acetylacetonate, zirconium octoate, zirconium versalate, aluminum acetylacetonate, mercuric acetate, phenylmercuric acetate, phenylmercuric propionate, organopolymercury compounds, and crown ether complexes of Lanthanide metals. Many of these catalysts are commercially available. Commercial mixtures of catalysts useful in the invention include Cocure, Cotin, and Coscat catalysts, (Caschem, Inc.); Niax catalysts (Union Carbide); Polycat catalysts (Abbott Laboratories); Dabco catalysts (Air Products and Chemicals Inc.); Thancat catalysts (Texaco Chemical Co.); Stanclere TL (AKZO Chemicals Inc.); K-Kat Catalysts (King Industries), Curene catalysts (Anderson Development Co.); Bulab 600 catalysts (Buckman Laboratories, Inc.); Optic Part 14× (PolyTech Development Corp.); Metasol catalysts (Calgon Corporation); CC-1 and CC-3 catalysts (Cardinal Carolina Corp.); Conacure catalysts (Conap, Inc.); Cata-check catalysts (Ferro Corp.); KR catalysts (Kenrich Petrochemicals, Inc.); BiCAT catalysts (Shepherd Chemical Co.); Texacat, ZR, ZF, DD, DMDEE catalysts (Texaco Chemical Co.); Thor 535 catalysts (Thor Chemicals, Inc.); Toyocat catalysts (Tosoh USA, Inc.). Combinations of catalysts, including any of the aforementioned, may also be useful.

In certain embodiments, the catalyst is present in the coating composition in an amount of up to 10 percent by weight, such as 0.02 to 5 percent by weight, or, in some cases, 0.08 to 2 percent by weight, with the weight percents being based on the total weight of the coating composition. By contrast, in other embodiments, the coating compositions of the present invention are substantially free, or, in some cases, completely free, of such a catalyst.

In certain embodiments, the coating compositions of the present invention comprise a moisture scavenger for the purpose of, for example, intentionally reducing the presence of excess water during, for example, stages of forming the coating composition where excess water is not desired. Suitable moisture scavenging ingredients include those such as calcium compounds, such as $CaSO_4$-$\frac{1}{2}H_2O$, and calcium-metal alkoxides, such as tetraisopropyltitanate, tetra n butyl titanate-silane, QP-5314, vinylsilane (A171), and organic alkoxy compounds, such as triethylorthoformate, methylorthoformate, dimethoxypropane.

In certain embodiments, the moisture scavenger is present in the coating composition of the present invention in an amount of up to 10 weight percent, such as 0.25 to 5 weight percent, or, in some cases 0.5 to 2 weight percent, with the weight percents being based on the total weight of the coating composition. By contrast, in other embodiments, the coating compositions of the present invention are substantially free, or, in some cases, completely free, of such a moisture scavenger.

In addition, other ingredients useful in forming the coating compositions of this invention include water, solvents, plasticizers, extenders, fillers, hydrocarbon resin modifiers, and various types of additives such as UV stabilizers, pigment wetting agents, flow and leveling additives, thixatropes, defoamers and the like.

The sources of water in the coating compositions of the present invention can be, for example, from a reaction between ingredients, atmospheric humidity, and water present in one or more of the ingredients. Water may be added during the formation of the composition to accelerate cure depending on the particular cure conditions, e.g., such as the use of the composition in arid environments where cure takes place at ambient temperature conditions.

In certain embodiments, the coating compositions of the present invention comprise a sufficient amount of water to facilitate unblocking of any curing agent present in the form of a ketimine or aldimine for subsequent cross linking, and/or to hydrolyze any alkoxy functionality in any alkoxy-functional silicone, silane ingredient, and/or curing agent provided in the form of an aminosilane.

Organic solvents can be added if desired. Suitable solvents include, for example, esters, ethers, alcohols, ketones, glycols and the like. In certain embodiments, the coating compositions of the present invention comprise up to 60 percent by weight organic solvent, based on the total weight of the coating composition.

In certain embodiments, the coating compositions of the present invention comprise an organic solvent but comprise little or no ketones. In certain embodiments, the coating compositions of the present invention comprise no more than 2 percent by weight, such as no more than 1 percent by weight, ketone, such weight percents being based on the total composition weight.

In certain embodiments, the coating compositions of the present invention comprise a colorant. As used herein, the term "colorant" means any substance that imparts color and/or other opacity and/or other visual effect to the composition. The colorant can be added to the coating in any suitable form, such as discrete particles, dispersions, solutions and/or flakes.

A single colorant or a mixture of two or more colorants can be used in the coating compositions of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coating compositions by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nanometers, such as less than 70 nanometers, or less than 30 nanometers. Nanoparticles can be produced by milling stock organic or inorganic pigments with grinding media having a particle size of less than 0.5 millimeters. Example nanoparticle dispersions and methods for making them are identified in U.S. Pat. No. 6,875,800 B2, which is incorporated herein by reference.

Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005/0287348 A1, filed Jun. 24, 2004, U.S. Provisional Application No. 60/482,167 filed Jun. 24, 2003, and United States Patent Application Publication 2006/0251896 A1, filed Jan. 20, 2006, which is also incorporated herein by reference.

Example special effect compositions that may be used in the compositions of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In certain embodiments, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In general, the colorant can be present in any amount sufficient to impart the desired visual and/or color effect. The colorant may comprise from, for example, 1 to 65 weight percent of the present compositions, such as from 3 to 40 weight percent or 5 to 35 weight percent, with weight percent based on the total weight of the compositions.

In certain embodiments, the compositions of the present invention comprise a finely divided particulate filler. Examples of fillers providing high heat resistance are barytes (barium sulfate), mica, micaceous iron oxide, aluminum flake, glass flake, stainless steel flake, and the like. Certain embodiments of the coating compositions of the present invention include up to 10 percent by weight filler based on the total weight of the composition.

In certain embodiments, when the one component coating composition is exposed to water, any curing agent provided in the form of a ketimine or aldimine is unblocked to expose amine functionality. The alkoxy-functional and/or silanol-functional silicone, any silane, and any curing agent in the form of an aminosilane comprising alkoxy groups undergoes hydrolysis in the presence of water, and polycondensation with themselves and with one another.

The combined ingredients used for forming the coating compositions of this invention are often provided in a moisture proof container to control or prevent unwanted evaporation and/or hydrolysis and condensation of the constituent chemical ingredients, thus increasing the shelf life of the mixture. Sealed metal cans are suitable.

In certain embodiments, the present invention is directed to a substrate at least partially coated with a coating deposited from any of the foregoing coating compositions. In certain embodiments, the coating compositions of the present invention may be applied directly to at least a portion of the substrate. In other embodiments, the coating compositions may be applied to any coating layer and/or treatment which was previously applied to at least a portion of the substrate. Compositions of this invention can be applied to a desired substrate surface to protect it from weathering, impact, and exposure to corrosion and/or chemicals.

The coating compositions of the present invention are suitable for application to any of a variety of substrates, including human and/or animal substrates, such as keratin, fur, skin, teeth, nails, and the like, as well as plants, trees, seeds, agricultural lands, such as grazing lands, crop lands and the like; turf-covered land areas, e.g., lawns, golf courses, athletic fields, etc., and other land areas, such as forests and the like.

Suitable substrates include cellulosic-containing materials, including paper, paperboard, cardboard, plywood and pressed fiber boards, hardwood, softwood, wood veneer, particleboard, chipboard, oriented strand board, and fiberboard. Such materials may be made entirely of wood, such as pine, oak, maple, mahogany, cherry, and the like. In some cases, however, the materials may comprise wood in combination with another material, such as a resinous material, i.e., wood/resin composites, such as phenolic composites, composites of wood fibers and thermoplastic polymers, and wood composites reinforced with cement, fibers, or plastic cladding.

Suitable metallic substrates include, but are not limited to, foils, sheets, or workpieces constructed of cold rolled steel, stainless steel and steel surface-treated with any of zinc metal, zinc compounds and zinc alloys (including electrogalvanized steel, hot-dipped galvanized steel, GALVANNEAL steel, and steel plated with zinc alloy), copper, magnesium, and alloys thereof, aluminum alloys, zinc-aluminum alloys such as GALFAN, GALVALUME, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable for use in the process of the present invention. Such weldable coating compositions are disclosed in, for example, U.S. Pat. Nos. 4,157,924 and 4,186,036. Cold rolled steel is also suitable when pretreated with, for example, a solution selected from the group consisting of a metal phosphate solution, an aqueous solution containing at least one Group IIIB or IVB metal, an organophosphate solution, an organophosphonate solution, and combinations thereof. Also, suitable metallic substrates include silver, gold, and alloys thereof. In certain embodiments, the metallic substrate may be blasted, for example, with sand and/or metal shot to provide a profile to the substrate.

Examples of suitable silicatic substrates are glass, porcelain and ceramics.

Examples of suitable cementitious materials are cement, aggregate, and granite.

Examples of suitable polymeric substrates are polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

Examples of suitable textile substrates are fibers, yarns, threads, knits, wovens, nonwovens and garments composed of polyester, modified polyester, polyester blend fabrics, nylon, cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric.

Examples of suitable leather substrates are grain leather (e.g. nappa from sheep, goat or cow and box-leather from calf or cow), suede leather (e.g. velours from sheep, goat or calf and hunting leather), split velours (e.g. from cow or calf skin), buckskin and nubuk leather; further also woolen skins and furs (e.g. fur-bearing suede leather). The leather may have been tanned by any conventional tanning method, in particular vegetable, mineral, synthetic or combined tanned (e.g. chrome tanned, zirconyl tanned, aluminium tanned or semi-chrome tanned). If desired, the leather may also be re-tanned; for re-tanning there may be used any tanning agent conventionally employed for re-tanning, e.g. mineral, vegetable or synthetic tanning agents, e.g., chromium, zirconyl or aluminium derivatives, quebracho, chestnut or mimosa extracts, aromatic syntans, polyurethanes, (co) polymers of (meth) acrylic acid compounds or melamine, dicyanodiamide and/or urea/formaldehyde resins.

Examples of suitable compressible substrates include foam substrates, polymeric bladders filled with liquid, polymeric bladders filled with air and/or gas, and/or polymeric bladders filled with plasma. As used herein the term "foam substrate" means a polymeric or natural material that comprises a open cell foam and/or closed cell foam. As used herein, the term "open cell foam" means that the foam comprises a plurality of interconnected air chambers. As used herein, the term "closed cell foam" means that the foam comprises a series of discrete closed pores. Example foam substrates include polystyrene foams, polymethacrylimide foams, polyvinylchloride foams, polyurethane foams, polypropylene foams, polyethylene foams, and polyolefinic foams. Example polyolefinic foams include polypropylene foams, polyethylene foams and/or ethylene vinyl acetate (EVA) foam. EVA foam can include flat sheets or slabs or molded EVA forms, such as shoe midsoles. Different types of EVA foam can have different types of surface porosity. Molded EVA can comprise a dense surface or "skin", whereas flat sheets or slabs can exhibit a porous surface.

Compositions of this invention are useful, for example, as a clearcoat, a basecoat, and/or a topcoat disposed either directly onto the substrate surface itself or disposed onto a prior or other underlying coating(s) and/or treatment(s), e.g., an inorganic or organic primer and/or basecoat material, disposed on the substrate surface to achieve a desired purpose.

Compositions of this invention can be applied to a substrate to be treated by conventional coating techniques such as, for example, dip coating, direct roll coating, reverse roll coating, curtain coating, spray coating, brush coating, and combinations thereof, among other methods. After application of the coating composition to the substrate, the composition is allowed to coalesce to form a substantially continuous film on the substrate. Typically, the film thicknesses will be 0.01 to 20 mils (about 0.25 to 508 microns), such as 0.01 to 5 mils (about 0.25 to 127 microns), or, in some cases 0.1 to 3 mils (2.54 to 76.2 microns) in thickness. If necessary, multiple layers can be applied to the substrate to be protected.

Although the coating compositions of the present invention are curable at low temperatures, such as at ambient temperatures, the coating compositions may also be cured over a broad range of temperature conditions, e.g., under conditions of elevated temperatures such as when the applied composition is subjected to a bake condition that can and will vary depending on the temperature of the surrounding environment, for example, temperatures that can vary from 5° C. to 60° C.

Illustrating the invention are the following examples that are not to be considered as limiting the invention to their details. All parts and percentages in the examples, as well as throughout the specification, are by weight unless otherwise indicated.

EXAMPLES

Test Methods:

Pot Life: samples are stored at ambient conditions for a specified period of time. Viscosity is measured using a Ford Cup #4 at a temperature of 20° C. to 25° C. Both the Ford Cup and the sample are at the aforementioned temperature range during the test.

Manual Drying: samples were spray applied in two (2) full coats onto degreased scuffed bare steel substrate. Film thickness of the applied coating ranges from 40 to 80 microns, preferably 50 to 70 microns. Dry time was recorded in minutes at a temperature of 20° C. to 25° C. and at a relative humidity of over 50% according to ASTM D1640.

BK Drying Time Recorder: this instrument is available from Gardco (conforms to ASTM 5895). Testing conditions: Temperature: 20° C. to 25° C.; Relative Humidity: 50%. The coating is spread onto a glass slide at a wet film thickness of approximately 200 microns. Dry time is measured through a needle which provides time in minutes.

Flexibility/Elongation: samples were applied to 0.6 mm steel substrate (degreased/scuffed) at a dry film thickness of 40 to 80 microns, preferably 50 to 70 microns. The coatings were permitted to dry approximately four (4) weeks at ambient conditions (Temperature, 20° C.-25° C.; Relative Humidity >50%) prior to testing. Conical Mandrel Bend and Elongation (%) were both tested on the samples according to ASTM D522. Reverse Impact Resistance was tested on the samples according to NCAA Technical Bulletin 4.2.6 and ASTM D2794.

Chemical Resistance: the test liquids were applied as a spot directly onto the dry coating film to be tested. The coating films were cured for approximately one (1) month prior to testing. A cotton wool pad was saturated with the test liquid and placed on the surface of the coating film in the same spot as the liquid was initially applied. A Petri dish was placed over the saturated pad to prevent evaporation of the test liquid. Test liquids with fast evaporation rates were reapplied to the cotton pad every 20 minutes to ensure the coating film was continuously exposed to the test liquid. After approximately one (1) hour, the test chemicals were removed with a damp cloth. The coating film was visually inspected both immediately and after a 24 hour recovery period.

Ratings for Chemical Resistance: 10 (perfect, no effect); 9 (very slight swelling of area in direct contact with test liquid); 8 (definite swelling of area in direct contact with test liquid); 7 (swelling of complete area under dish); 6 (swelling and pitting of area under dish); 5 (extensive swelling of the covered area and pitting of the area); 0 (completely dissolved).

Preparation of Flexibilizers

Flexibilizers (Examples 1 through 6) were prepared using the components and amounts identified in Table 1.

TABLE 1

| Description | 1 | 2 | 3 | 4 | 5 | 6 |
| --- | --- | --- | --- | --- | --- | --- |
| Dow Corning Z-6040[1] | 51.38 | — | — | — | — | — |
| Desmophen NH 1220[2] | 48.62 | — | — | — | — | — |
| Silquest A-1110[3] | — | 60.0 | — | — | — | — |
| 1,6-hexanediol diacrylate | — | 40.0 | — | — | — | — |
| Desmodur N3400[4] | — | — | 36.65 | — | — | — |
| Silquest A-Link 15[5] | — | — | 43.51 | — | — | — |
| Dowanol PM[6] | — | — | 19.84 | — | — | — |
| Arcol 1150[7] | — | — | — | 64.03 | — | — |
| Desmophen A450[8] | — | — | — | — | 85.72 | — |
| Paraloid AU-191X[9] | — | — | — | — | — | 81.92 |
| Silquest A-Link 25[10] | — | — | — | 30.09 | 11.85 | — |
| Silquest A-Link 35[11] | — | — | — | — | — | 15.84 |
| Tegokat 716[12] | — | — | — | 0.06 | 0.02 | — |
| Xylene | — | — | — | 0.52 | 0.21 | 2.15 |

TABLE 1-continued

| Description | 1 | 2 | 3 | 4 | 5 | 6 |
|---|---|---|---|---|---|---|
| Mineral Spirits | — | — | — | 5.30 | 2.20 | — |
| Aromatic 100 | — | — | — | — | — | 0.21 |
| Totals | 100 | 100 | 100 | 100 | 100 | 100 |

[1]Glycidoxypropyltrimethoxysilane commercially available from Dow Corning.
[2]Aspartic ester diamine commercially available from Bayer Corporation.
[3]γ-aminopropyltrimethoxysilane commercially available from GE Silicones.
[4]Hexamethylene diisocyanate commercially available from Bayer Corp.
[5]N-ethyl-3-trimethoxysilyl-2-methylpropanamine commercially available from Momentive Performance Materials.
[6]Propylene glycol methyl ether commercially available from The Dow Chemical Company.
[7]Polyether polyol commercially available from Bayer.
[8]Acrylic polyol commercially available from Bayer.
[9]Acrylic Polyol available from Rohm & Haas.
[10]γ-isocyanatopropyltriethoxysilane commercially available from OSi Specialties.
[11]γ-isocyanatopropyltriethoxysilane commercially available from OSi Specialties.
[12]Catalyst commercially available from TIB Chemicals.

In Example 1, Dow Corning Z-6040 was combined with Desmophen NH 1220 under agitation. The reactants were permitted to react for approximately one (1) hour at a temperature of approximately 55° C. followed by approximately sixteen (16) hours at a temperature of approximately 20° C. to 25° C. to provide a flexibilizer.

In Example 2, Silquest A-1110 was combined with 1,6-hexanediol diacrylate under agitation. The reactants were permitted to react at a temperature of approximately 60° C. for a period of time until the disappearance of the acrylate double bond was demonstrated by IR (peak at ~1621 $cm^{-1}$) and/or NMR (peaks at ~5.7-6.4 ppm) analysis.

In Example 3, Silquest A-Link 15 was added to Desmodur N3400 slowly under agitation and under a nitrogen sparge. The reaction was exothermic. The combination was allowed to cool to room temperature over a period of approximately four (4) hours. Dowanol PM was then added under agitation.

In Example 4, Arcol 1150 and Silquest A-Link 25 were combined under agitation and permitted to react for approximately one (1) hour at an approximate temperature of 55° C. Next, Tegokat 716 and xylene were combined to form a solution, and the solution was added to the Arcol 1150/Silquest A-Link 25 combination. Again, the mixture was permitted to react for approximately one (1) hour at an approximate temperature of 55° C. After cooling, the mineral spirits were added under agitation.

In Example 5, Desmophen A450 was combined with Silquest A-Link 25 and reacted for approximately one (1) hour at a temperature of approximately 55° C. A pre-solution of Tegokat 716 and xylene was prepared, and the solution was added under agitation. Again, the mixture was permitted to react for approximately one (1) hour at an approximate temperature of 55° C. After cooling, the mineral spirits were added under agitation.

In Example 6, Paraloid AU-191X was combined with Silquest A-Link 25 and reacted for approximately sixty (60) minutes at a temperature of approximately 120° F. After cooling, the xylene and Aromatic 100 were added under agitation.

Preparation of Coating Compositions:

Coating compositions (Examples 6 through 10) were prepared using the components and amounts identified in Table 2. Comparative Example 6 shows a composition without the use of any Flexibilizer. In Comparative Example 6 and Examples 7 through 8, component F was prepared by combining Neostann U-220/Metatin 740, then components F, G, and H were pre-blended under agitation to provide the "Curing Agent Blend". Components A and B were blended together in a separate container followed by addition of the Flexibilizer (e.g., Example 2 or 3), then addition of the Curing Agent Blend, all under agitation. It would be recognized by one skilled in the art that if outdoor exposure is required, a suitable UV absorber and hindered amine light stabilizer should be added at their appropriate amounts.

In Example 9, components G and H were pre-blended under agitation to provide the "Curing Agent Blend". In a separate container, components A and B were blended together, followed by addition of the Flexibilizer (e.g., Example 3) and then the Curing Agent Blend, all under agitation.

In Example 10, components G and H were pre-blended under agitation to provide the "Curing Agent Blend". In a separate container, components A1 and B were blended together. A pre-blended solution of components C, D, and E was prepared under agitation and this solution was added to the blend of components A1 and B. Then, the Flexibilizer (e.g., Example 4/5) was added followed by addition of the Curing Agent Blend, all under agitation.

TABLE 2

| Component | Description | 6 | 7 | 8 | 9 | 10 |
|---|---|---|---|---|---|---|
| A | Dow Corning 805[1] | 57.14 | 50.74 | 51.17 | 56.40 | — |
| A1 | Dow Corning 409[2] | — | — | — | — | 5.95 |
| B | Dow Corning 3074[3] | 28.57 | 25.37 | 25.58 | 21.38 | 15.14 |
| C | Dowanol PM[4] | — | — | — | — | 2.83 |
| D | Dow Corning Z-6018[5] | — | — | — | — | 0.94 |
| E | DBTDL[6] | — | — | 0.64 | — | 1.65 |
| | Example 1 | — | 11.21 | — | — | — |
| | Example 2 | — | — | 16.21 | — | — |
| | Example 3 | — | — | — | 9.14 | — |
| | Example 4 | — | — | — | — | 37.74 |
| | Example 5 | — | — | — | — | 20.57 |
| F | Neostann U-220H[7]/ Metatin 740[8] | 0.98 | 0.87 | 0.44 | — | — |
| G | Silquest A-1110[9] | 4.00 | 3.55 | 1.79 | 3.90 | 4.55 |
| H | Dow Corning Z-6011[10] | 9.31 | 8.26 | 4.17 | 9.19 | 10.63 |
| | Total | 100 | 100 | 100 | 100 | 100 |

[1]Silanol-functional silicone resin commercially available from Dow Corning.
[2]Silanol-functional silicone resin commercially available from Dow Corning.
[3]Alkoxy-functional silicone resin commercially available from Dow Corning.
[4]Propylene glycol methyl ether commercially available from The Dow Chemical Company.
[5]Propylphenylsilanediol commercially available from Dow Corning.
[6]Dibutyltindilaurate.
[7]Dibutyltindilaurate catalyst commercially available from Nitto Kasei Co., Ltd.
[8]Dibutyltinketonate catalyst commercially available from Acima.
[9]γ-aminopropyltrimethoxysilane commercially available from Momentive Performance Materials.
[10]Aminopropyltriethoxysilane commercially available from Dow Corning.

Results of Comparative Example 6 and Examples 7 through 8 are set forth in Table 3.

TABLE 3

| Test | Comparative Example 6 | Example 7 | Example 8 |
|---|---|---|---|
| Pot Life (Ford #4 - seconds) | 20 (at 16 h) | 21 (at 16 h) | 23 (at 20 h) |
| | 18 (at 24 h) | 19 (at 24 h) | 21 (at 27 h) |
| | 16 (at 5 days) | 21 (at 5 days) | 20 (at 6 days) |
| Manual Drying (minutes) | 36 (dust free) | 37 (dust free) | 26 (dust free) |
| | 85 (tack free) | 90 (tack free) | 63 (tack free) |
| | 182 (print free) | 184 (print free) | 91 (print free) |
| BK Dry Recorder (minutes) | 30 (dust free) | 22 (dust free) | 12 (dust free) |
| | 61 (tack free) | 32 (tack free) | 22 (tack free) |
| | 76 (print free) | 89 (print free) | 52 (print free) |
| | 216 (hard dry) | 137 (hard dry) | 76 (hard dry) |
| Mandrel Bend (crack length in inches) (ASTM D522) | 3.7 | 0.8 | 1.25 |
| Reverse Impact (Joules) (ASTM D2794) | 0 Joules | 2 Joules | — |
| % Elongation (ASTM D522) | 5 | 14 | 11 |
| Chemical Resistance: (ASTM 1308) | | | |
| 50% Sodium Hydroxide | 10 (no etch) | 10 (no etch) | 10 (no etch) |
| 50% concentrated Ammonium Hydroxide | 10 (no etch) | 10 (no etch) | 10 (no etch) |
| 50% concentrated Sulfuric Acid | 10 (no etch) | 10 (no etch) | 10 (no etch) |
| 80% Phosphoric Acid | 10 (no etch) | 10 (no etch) | 10 (no etch) |
| 50% Glacial Acetic Acid | 10 (no etch) | 9 (10) | 10 (no etch) |
| Acetone | 9* (10) | 0 | 10 (no etch) |
| Ethanol (95%) | 9 (10) | 10 (no etch) | 10 (no etch) |
| 150+ Methyl Ethyl Ketone (double rubs with cloth) | No effect | No effect | — |

*very slight swelling of the area under the dish.
Numbers in parenthesis ( ) indicates 24 hour recovery rating if different from initial rating.

Results of Comparative Example 6 and Example 9 through 10 are set forth in Table 5.

TABLE 5

| Test | Comparative Example 6 | Example 9 | Example 10 |
|---|---|---|---|
| Pot Life (Ford #4 - seconds) | 18 (at 24 h) | 45 (at 24 h) | 39 (at 20 h) |
| | 16 (at 5 days) | 28 (at 5 days) | 46 (at 5 days) |
| Manual Drying (minutes) | 36 (dust free) | 30 (dust free) | 28 (dust free) |
| | 85 (tack free) | 50 (tack free) | 59 (tack free) |
| | 182 (print free) | 70 (print free) | 106 (print free) |
| BK Dry Recorder (minutes) | 30 (dust free) | 17 (dust free) | 16 (dust free) |
| | 61 (tack free) | 34 (tack free) | 24 (tack free) |
| | 76 (print free) | 73 (print free) | 31 (print free) |
| | 216 (hard dry) | 206 (hard dry) | 43 (hard dry) |
| Mandrel Bend (crack length in inches) | 3.7 | 0.7 | 0 |
| Reverse Impact (Joules) (ASTM D522) | 0 Joules | 2 Joules | 12 Joules |
| % Elongation | 5 | 14 | >26 |

Example 11 was prepared according to the ingredients set forth in Table 6.

TABLE 6

| Description | Example 11 |
|---|---|
| Dow Corning 409HS | 105.4 |
| Dow Corning 3074 | 120.0 |
| Tioxide TR93[1] | 228.0 |
| Dow Corning Z-6194[2] | 4.1 |
| Dow Corning Z-6341[3] | 16.4 |
| KBM-403[4] | 29.6 |
| Tinuvin 292[5] | 15.2 |
| Tego Foamex N[6] | 4.0 |
| MPA-2000X[7] | 5.8 |
| Methyl n-Amyl Ketone[8] | 31.2 |
| KBM-903[9] | 19.3 |
| Example 6 | 200.0 |

[1]Titanium dioxide pigment commercially available from Huntsman.
[2]Dimethyldimethoxysilane commercially available from Dow Corning.
[3]Octyltriethoxysilane commercially available from Dow Corning.
[4]Adhesion promoter commercially available from Shin-Etsu.
[5]Hindered amine light stabilizer commercially available from Ciba Geigy.
[6]Defoamer commercially available from Tego.
[7]Anti-settling agent commercially available from Monsanto.
[8]Solvent
[9]Aminosilane commercially available from Shin-Etsu.

All of the ingredients were added under high speed agitation using a cowles blade. After Example 11 was prepared, it was spray applied to sandblasted steel panels (2.0 mil profile) at a dry film thickness of approximately 3.0 mils (approximately 76.2 microns). Dry times were measured using ASTM D1640. Conical mandrel elongation test panels were cured for 3 days at 72° F./50% relative humidity followed by eleven (11) days cure at ambient conditions. Test Data is reflected in Table 7.

TABLE 7

| Test | Example 11 |
|---|---|
| Pot Life (Brookfield Viscosity* - centipoise) | 900 (initial) 1200 (at 69 days) |
| Manual Drying (hours) (ASTM D1640) | Dry Through 4.5-5.0 hours |
| % Elongation | 10.8 |

*Brookfield viscosity was measured using a Brookfield Model LVT instrument with a number 3 spindle at 60 rpm.

Examples 7-11 demonstrate improved flexibility, for example, improved elongation and mandrel bend properties, of a coating film while maintaining good dry times, good chemical resistance, and good storage stability in a one-component composition compared with similar compositions without a flexibilizer.

Examples 12A-12K

Coating compositions were prepared using the ingredients listed in Table 8. The ingredients of Part B were mixed until uniform before the addition of Part A. The liquid compositions were evaluated for Gardner colour according to ASTM D-1544 (after 2 weeks at 140° F.—lower value represents less yellow). The compositions were spray applied to sandblasted steel panels (2.0 mil profile) at a dry film thickness of approximately 3.0 mils (approximately 76.2 microns). Dry times were measured using ASTM D1640 (72° F./50% relative humidity, 5 mils wet film). Results are also set forth in Table 8.

TABLE 8

| Ingredient | 12A | 12B | 12C | 12D | 12E |
|---|---|---|---|---|---|
| Part B | | | | | |
| Dow Corning 409HS[1] | 127.5 | 127.5 | 127.5 | 127.5 | 127.5 |
| Dow Corning 3074[2] | 148.2 | 148.2 | 148.2 | 148.2 | 148.2 |
| Vinyltrimethoxysilane | 44.6 | 44.6 | 44.6 | 44.6 | 44.6 |
| Dow Corning Z-6194[3] | 5.7 | 5.7 | 5.7 | 5.7 | 5.7 |
| OFS-6341[4] | 22 | 22 | 22 | 22 | 22 |
| Tinuvin 292[5] | 30.1 | 30.1 | 30.1 | 30.1 | 30.1 |
| Xylene | 25.2 | 25.2 | 25.2 | 25.2 | 25.2 |
| KBE-903[6] | — | 16 | — | — | — |
| KBM-903[7] | — | — | 16 | — | — |
| A-1637[8] | — | — | — | 16 | — |
| A-2639[9] | — | — | — | — | 16 |
| A-1170[10] | — | — | — | — | — |
| A-1120[11] | — | — | — | — | — |
| A-1130[12] | — | — | — | — | — |
| A-link 25[13] | — | — | — | — | — |
| Ethylaminoethanol | — | — | — | — | — |
| Methyltrimethoxysilane | — | — | — | — | — |
| Part A | | | | | |
| Silane Functional Urethane[14] | 261 | 261 | 261 | 261 | 261 |
| RESULTS | | | | | |
| Gardner Colour | 4 | 16 | 14 | 11 | 11 |
| Dry Time (hours) | 16+ | 4 | 4 | 7 | 12 |

TABLE 8

| Ingredient | 12F | 12G | 12H | 12I | 12J | 12K |
|---|---|---|---|---|---|---|
| Part B | | | | | | |
| Dow Corning 409HS[1] | 127.5 | 127.5 | 127.5 | 127.5 | 127.5 | 127.5 |
| Dow Corning 3074[2] | 148.2 | 148.2 | 148.2 | 148.2 | 148.2 | 148.2 |
| Vinyltrimethoxysilane | 44.6 | 44.6 | 44.6 | 44.6 | 44.6 | 44.6 |
| Dow Corning Z-6194[3] | 5.7 | 5.7 | 5.7 | 5.7 | 5.7 | 5.7 |
| XIAMETER ® OFS-6341[4] | 22 | 22 | 22 | 22 | 22 | 22 |
| Tinuvin 292[5] | 30.1 | 30.1 | 30.1 | 30.1 | 30.1 | 30.1 |
| Xylene | 25.2 | 25.2 | 25.2 | 25.2 | 25.2 | 25.2 |
| KBE-903[6] | — | — | — | — | — | — |
| KBM-903[7] | — | — | — | — | — | — |
| Silquest ® A-1637[8] | — | — | — | — | — | — |
| Silquest ® A-2639[9] | — | — | — | — | — | — |
| Silquest ® A-1170[10] | 16 | — | — | — | — | — |
| Silquest ® A-1120[11] | — | 16 | — | — | — | 4 |
| Silquest ® A-1130[12] | — | — | 16 | — | — | — |
| Silquest ® A-link 25[13] | — | — | — | 16 | — | — |
| Ethylaminoethanol | — | — | — | — | 16 | 16 |
| Methyltrimethoxysilane | — | — | — | — | 16 | 16 |
| Part A | | | | | | |
| Silane Functional Urethane[14] | 261 | 261 | 261 | 261 | 261 | 261 |
| RESULTS | | | | | | |
| Gardner Colour | 15 | 9 | 15 | 12 | 4 | 5 |
| Dry Time (hours) | 5.5 | 4 | 4 | 8 | 6 | 4 |

[1]Silanol-functional silicone resin commercially available from Dow Corning.
[2]Alkoxy-functional silicone resin commercially available from Dow Corning.
[3]Dimethyldimethoxysilane commercially available from Dow Corning.
[4]Octyltriethoxysilane commercially available from Dow Corning.
[5]Hindered amine light stabilizer commercially available from Ciba Geigy.
[6]Aminopropyltriethoxysilane commercially available from Shin-Etsu.
[7]Aminopropyltrimethoxysilane commercially available from Shin-Etsu.
[8]Aminoneohxyltrimethoxysilane commercially available from Momentive
[9]Aminoneohxylmethyldimethoxysilane commercially available from Momentive
[10]Bis-trimethoxysilylpropylamine commercially available from Momentive.
[11]Aminoneohexylmethyldimethoxysilane commercially available from Momentive.
[12]Aminoethylaminoethylaminopropyltrimethoxysilane commercially available from Momentive
[13]γ-isocyanatopropyltriethoxysilane commercially available from Momentive.
[14]Reaction product of Silquest A-Link 25 (γ-isocyanatopropyltriethoxysilane commercially available from Momentive) and Paraloid AU-191X (acrylic polyol commercially available from Rohm & Haas) in an approximately 1:1 ratio of isocyanate groups to hydroxyl groups.

It will be appreciated by those skilled in the art that changes could be made to the embodiments described above without departing from the broad inventive concept thereof. Whereas particular embodiments of this invention have been described above for purposes of illustration, it will be evident to those skilled in the art that numerous variations of the details of the present invention may be made without departing from the invention as defined in the appended claims.

What is claimed is:

1. A one-component coating composition comprising:
(a) an alkoxy and/or silanol-functional silicone, wherein the silanol-functional silicone comprises a compound represented by the general formula:

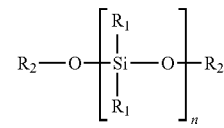

wherein:
(i) each $R_1$ is independently selected from the group consisting of a hydroxy group, an alkyl group having up to six carbon atoms, and an aryl group having up to six carbon atoms;

(ii) each $R_2$ is independently selected from the group consisting of a hydrogen, an alkyl group having up to six carbon atoms, and an aryl group having up to six carbon atoms, wherein at least one of $R_1$ and $R_2$ is selected such that the compound comprises a silanol group; and (iii) n is selected so that the silanol-functional silicone has a weight average molecular weight in the range of from 200 to 7,000; and the alkoxy-functional silicone comprises a compound represented by the general formula:

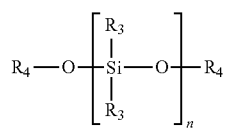

wherein:
(i) each $R_3$ is independently selected from the group consisting of an alkyl group having up to six carbon atoms, an aryl group having up to six carbon atoms, and an alkoxy group having up to about six carbon atoms;

(ii) each $R_4$ is independently selected from the group consisting of an alkyl group having up to six carbon atoms and an aryl group having up to six carbon atoms; and (iii) n is selected so that the alkoxy-functional silicone has a weight average molecular weight in the range of from 800 to 2,500;

(b) a polymer comprising an alkoxysilane terminal unit and a urethane linkage;

(c) an aminosilane present in an amount of 0.01 to less than 1 percent by weight, based on the total weight of the composition;

(d) an aminoalcohol; and (e) a trifunctional oxysilane.

2. The coating composition of claim 1, wherein the silanol-functional silicone comprises phenyl groups, methyl groups, and combinations thereof.

3. The coating composition of claim 2, wherein the ratio of phenyl groups to methyl groups present in the silanol-functional silicone ranges from 1:1 to 1.3:1.

4. The coating composition of claim 1, wherein:
(a) the silanol-functional silicone is present in the coating composition in an amount of 1 to 30 percent by weight;
(b) the alkoxy-functional silicone is present in the coating composition in an amount of 10 to 50 percent by weight;
(c) the polymer comprising an alkoxysilane terminal unit and a urethane linkage is present in the coating composition in an amount of 0.5 to 30 percent by weight; and
(d) the aminoalcohol and the trifunctional oxysilane are both present in the coating composition in an amount of 1 to 5 percent by weight, wherein the weight percents are based on the total weight of the coating composition.

5. The coating composition of claim 1, wherein the polymer comprising an alkoxysilane terminal unit and a urethane linkage comprises a reaction product of reactants comprising a hydroxyl functional resin and an isocyanate functional silane.

6. The coating composition of claim 5, wherein the hydroxyl functional resin comprises acrylic resin, a polyester resin, and/or a polyether resin.

7. The coating composition of claim 1, wherein the aminosilane comprising a compound having the general formula: Y—Si—(O—X)$_3$, wherein:
(a) each X is independently selected from an alkyl group, a hydroxyalkyl group, an alkoxyalkyl group and a hydroxyalkoxyalkyl group, each group containing less than six carbon atoms, and
(b) Y is H(HNR)$_c$, wherein:
(i) c is an integer of from 1 to 6; and
(ii) R is a difunctional organic radical independently selected from the group consisting of an aryl group, an alkyl group, a dialkylaryl group, an alkoxyalkyl group, and a cycloalkyl group, and where R can vary within each Y molecule.

8. The coating composition of claim 1, wherein the weight ratio of aminosilane to aminoalcohol in the coating composition is no more than 1:1.

9. The coating composition of claim 7, wherein the weight ratio of aminosilane to aminoalcohol in the coating composition is no more than 0.5:1.

10. The composition of claim 1, further comprising an organometallic catalyst.

11. The composition of claim 1, further comprising a moisture scavenger.

12. A substrate at least partially coated with a coating deposited from the coating composition of claim 1.

* * * * *